C. M. GEARING.
Apparatus for Burning Oil.

No. 157,596. Patented Dec. 8, 1874.

WITNESSES
Franck L. Durand
C. L. Eurich

INVENTOR
Charles M. Gearing,
per Alexander Mason
Attorneys

UNITED STATES PATENT OFFICE.

CHARLES M. GEARING, OF PITTSBURG, PENNSYLVANIA, ASSIGNOR OF ONE-HALF HIS RIGHT TO JOHN B. LIVINGSTON, J. F. D. KEATING, AND GEORGE A. Q. MILLER, OF SAME PLACE.

IMPROVEMENT IN APPARATUS FOR BURNING OIL.

Specification forming part of Letters Patent No. 157,596, dated December 8, 1874; application filed November 21, 1874.

*To all whom it may concern:*

Be it known that I, CHARLES M. GEARING, of Pittsburg, in the county of Allegheny and in the State of Pennsylvania, have invented certain new and useful Improvements in Apparatus for Burning Oils; and do hereby declare that the following is a full, clear, and exact description thereof, reference being had to the accompanying drawings, and to the letters of reference marked thereon, making a part of this specification.

The nature of my invention consists in the construction and arrangement of a device for burning petroleum or other hydrocarbon liquids in furnaces, as will be hereinafter more fully set forth.

In order to enable others skilled in the art to which my invention appertains to make and use the same, I will now proceed to describe its construction and operation, referring to the annexed drawing, in which—

Figure 1:
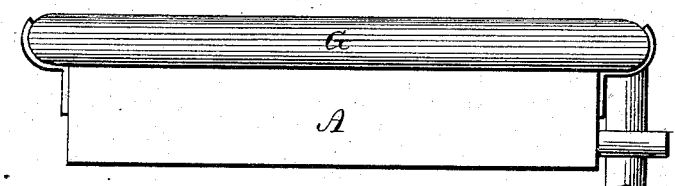
Figure 2:
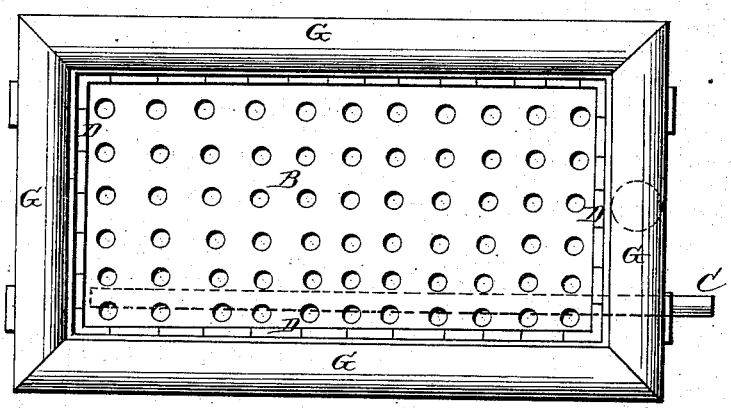
Figure 3:
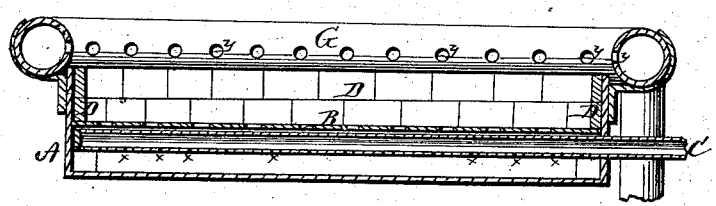

Figure 1 is a side view of my invention. Fig. 2 is a plan view of the same, and Fig. 3 is a longitudinal vertical section through the feed-pipe of the apparatus.

A represents a pan of any suitable dimensions, corresponding with the size of the furnace in which it is to be used, and is to be placed on the ordinary grate-bars therein. Within the pan A is a false perforated bottom or perforated plate, B, elevated any suitable distance above the real bottom of the pan, the plate being supported upon legs, ledges, or by any suitable mechanical means. Through the front of the pan A enters a pipe, C, below the perforated plate B, which pipe runs the entire length of the pan, is closed at its inner end, and is provided on its under side with a series of perforations, $x\ x$. This pipe C is connected with a tank or reservoir containing petroleum or other hydrocarbon liquid, and provided with a graduating-valve or other equivalent device for feeding any desired amount of the oil to the pipe. The oil passes through the perforations $x$ in the bottom of the pipe C, and fills the space below the plate B. The oil then rises through the perforations in said plate B and ignites. Above the perforated plate B the pan A is lined with fire-brick D, as shown in Figs. 2 and 3. Around the edges of the pan A is a pipe, G, provided with perforations $y$ on the inner side, immediately above the edge of the pan. This pipe is to be connected with an air-blast, air-injector, or other suitable mechanical device for forcing air through the pipe, which air passes out through the perforations $y$ onto the flame.

By properly regulating the air-injecting apparatus perfect combustion is obtained, and by admitting an excess of air the fire is easily cooled off.

By this device petroleum or any hydrocarbon liquid may be used as fuel in any furnace where desired.

Having thus fully described my invention what I claim as new, and desire to secure by Letters Patent, is—

The combination of the pan A, perforated plate B, perforated inlet-pipe C, and perforated air-pipe G, all constructed and arranged to operate substantially as and for the purposes herein set forth.

In testimony that I claim the foregoing I have hereunto set my hand this 20th day of November, 1874.

CHARLES M. GEARING.

Witnesses:
  C. L. EVERT,
  H. A. HALL.